US005622548A

United States Patent [19]
Zou et al.

[11] Patent Number: 5,622,548
[45] Date of Patent: Apr. 22, 1997

[54] DUPLICATING INKS FOR DIGITAL DUPLICATORS

[75] Inventors: Wan K. Zou, Northbrook; Clement N. Onyenemezu, Schiller Park, both of Ill.

[73] Assignee: MICAP Technology Corp., Niles, Ill.

[21] Appl. No.: 600,703

[22] Filed: Feb. 13, 1996

Related U.S. Application Data

[63] Continuation-in-part of Ser. No. 444,402, May 19, 1995, abandoned.

[51] Int. Cl.$^6$ .............. C09D 11/02; C09D 11/06; C09D 11/08
[52] U.S. Cl. ............ 106/20 C; 106/27 R; 106/27 A; 106/476; 106/500; 106/504
[58] Field of Search ............ 106/27 A, 27 R, 106/20 C, 23 C, 23 E, 476, 500, 504

[56] References Cited

U.S. PATENT DOCUMENTS

| 2,839,412 | 6/1958 | Igler et al. ............ 106/29 R |
|---|---|---|
| 3,421,910 | 1/1969 | Gilson et al. ............ 106/145 |
| 3,823,020 | 7/1974 | Gilson et al. ............ 106/30 R |
| 3,886,084 | 5/1975 | Vassiliades ............ 106/21 C |
| 4,069,179 | 1/1978 | Jones ............ 106/20 R |
| 4,094,685 | 6/1978 | Lester et al. ............ 260/2.5 B |
| 4,264,700 | 4/1981 | Bayley ............ 430/137 |
| 4,421,660 | 12/1983 | Solc nee Hajna ............ 252/62.54 |
| 4,439,510 | 3/1984 | McLoughlin ............ 430/137 |
| 4,447,516 | 5/1984 | Matkan ............ 430/107 |
| 4,665,107 | 5/1987 | Micale ............ 523/105 |
| 4,889,877 | 12/1989 | Seitz ............ 106/20 C |
| 4,981,517 | 1/1991 | DeSanto, Jr. et al. ............ 106/30 R |
| 5,158,606 | 10/1992 | Carlick et al. ............ 106/20 R |
| 5,378,739 | 1/1995 | Koike et al. ............ 523/161 |
| 5,389,130 | 2/1995 | Batlaw et al. ............ 106/20 R |
| 5,395,435 | 3/1995 | Mizobuchi ............ 106/27 R |
| 5,417,749 | 5/1995 | Krishnan et al. ............ 106/20 R |

FOREIGN PATENT DOCUMENTS

| 768013 | 12/1971 | Belgium . |
|---|---|---|
| 2145070 | 5/1994 | Canada . |
| 0036101 | 2/1981 | European Pat. Off. . |
| 609076 | 8/1994 | European Pat. Off. . |
| 59-098890 | 6/1984 | Japan . |
| 60-189491 | 9/1985 | Japan . |
| 61-188475 | 8/1986 | Japan . |
| 61-255967 | 11/1986 | Japan . |
| 63-027569 | 2/1988 | Japan . |
| 2209976 | 8/1990 | Japan . |
| 4132777 | 5/1992 | Japan . |
| 4233980 | 8/1992 | Japan . |
| 4372671 | 12/1992 | Japan . |
| 5070729 | 3/1993 | Japan . |
| 5070730 | 3/1993 | Japan . |
| 5117564 | 5/1993 | Japan . |
| 5117565 | 5/1993 | Japan . |
| 5271592 | 10/1993 | Japan . |
| 5279608 | 10/1993 | Japan . |
| 6009912 | 1/1994 | Japan . |
| 6116525 | 4/1994 | Japan . |
| 6128516 | 5/1994 | Japan . |
| 6172693 | 6/1994 | Japan . |
| 6172691 | 6/1994 | Japan . |
| 6192606 | 7/1994 | Japan . |
| 6329970 | 11/1994 | Japan . |
| 956313 | 9/1982 | U.S.S.R. . |
| 8800961 | 2/1988 | WIPO . |

*Primary Examiner*—Helene Klemanski
*Attorney, Agent, or Firm*—Leydig, Voit & Mayer, Ltd.

[57] ABSTRACT

The present invention provides a water-in-oil emulsion ink comprising an oil phase and a water phase, the oil phase comprising an encapsulated colorant, an oil phase oil, a surface active agent, and a film-forming component, and the water phase comprising water. The present invention also provides an encapsulated colorant comprising a colorant having a particle size of from about 0.01 microns to about 25 microns, a binder resin, a saturated oil, a viscosity adjusting agent, and an adhesion promoter. The present invention also provides an improved process of digital duplicating wherein the improvement comprises using the emulsion ink of the present invention.

59 Claims, No Drawings

DUPLICATING INKS FOR DIGITAL DUPLICATORS

CROSS-REFERENCE TO A RELATED APPLICATION

This is a continuation-in-part application of U.S. patent application Ser. No. 08/444,402, filed May 19, 1995, now abandoned.

TECHNICAL FIELD OF THE INVENTION

The present invention relates to duplicating inks, and particularly to water-in-oil emulsion duplicating inks used in digital duplicators.

BACKGROUND OF THE INVENTION

Emulsion inks are generally used in digital duplicating processes. In those processes, the ink is introduced into a cylinder having a plurality of small holes. The circumferential wall of the cylinder is formed with such holes, and a stencil is wrapped around the cylinder. During the printing process, the ink penetrates through the holes in the cylinder and the selectively formed image openings in the stencil onto the surface of a paper. The paper is held in contact with the cylinder and stencil by means of a platen roller.

Emulsion inks are formulated with an oil phase and an aqueous phase. The oil phase generally contains drying oils. The colorant is dispersed either in the oil phase or in the water phase. Several ink formulations having carbon black colorant dispersed in the aqueous phase are disclosed in U.S. Pat. Nos. 2,839,412, 3,421,910, and 3,823,020. U.S. Pat. No. 5,378,739 discloses an ink formulation having carbon black dispersed in the oil phase.

The fibers of the paper have numerous small pores, which act to break down the two phases in the ink as the ink is absorbed into the paper. The water in the aqueous phase diffuses through the paper leaving behind the carbon black on the surface. The drying oils of the oil phase dry and form a film on the carbon black and immobilize the carbon black on the paper to produce a permanent image.

Certain problems have been experienced in using ink formulations having the colorant dispersed in the aqueous phase, particularly the "bleed through" problem. The water from the water phase that diffuses through the pores of the paper carries the colorant along with it. This "bleed through" results in the colorant being deposited on the back side of the paper. The colorant deposited on the back side becomes visible and the quality of the printed image thus becomes poor.

Inks heretofore known and that have the colorant dispersed in the oil phase also present certain problems. For instance, the ink formulation of the '739 patent presents certain problems. The '739 ink is composed of an oil phase and a water phase with the respective ratios by wt. % thereof being (20 to 40):(80 to 60). The oil phase is composed of a solvent component containing a volatile solvent with an initial boiling point of 150° C. to 210° C., and a non-volatile solvent, with the respective ratios by wt. % thereof being (10 to 30):(90 to 70), a coloring agent, a resin, and a surface active agent, with the amount of the resin in the oil phase being in the range of 2 to 8 wt. % of the total weight of the emulsion. The amount and the volatile nature of the solvents used in the '739 ink may pose an environmental hazard.

U.S. Pat. No. 4,069,179 discloses an emulsion ink suitable for typewriter ribbons, carbon papers, and the like, comprising an aqueous phase containing a solubilized partially hydrolyzed polyvinyl acetate polymer and an oil phase dispersed therein and comprising a colorant, a fatty alcohol having even number of carbon atoms in the range of 12–20, and a fatty acid. This ink is not considered suitable for use in digital duplicators in view of the poor quality of the image produced when this ink is used in digital duplicators.

Certain emulsion inks heretofore known use excessive amounts of oils and surfactants which tend to impair print quality. The surfactants and oils diffuse through the paper horizontally and vertically and make the paper become transparent.

The colorants dispersed in the water phase or in the oil phase of certain ink formulations heretofore known contain agglomerations of the colorants. The agglomeration of colorant particles results in an ink having a mixture of large and small colorant particles. Such inks have been found to give poor duplicator runnabilty due to clogging of the cylinder mesh by the large particles. These inks therefore offer poor image quality, weak color strength, low image density, poor set off and poor image resolution. The agglomeration of the colorant particles, which is due to the surface energies of the particles, has not been prevented due to the fact that the colorants used in these formulations have not been subjected to any coating or other surface treatment that would prevent the agglomeration of the particles.

Attempts have been made in the industry to modify the surface of the colorant particles by encapsulating the particles with a polymer. For instance, U.S. Pat. No. 4,421,660 discloses a method of encapsulation which involves emulsion polymerization of polymerizable monomers for surrounding discrete colorant particles with a polymer matrix. As one of ordinary skill in the art would know, carrying out the emulsion polymerization has certain complexity associated with it; for example, it requires a new investigation of appropriate conditions to induce a polymerization for a desired concentration and material for each specific application to which the encapsulated colorant will be used for.

U.S. Pat. No. 4,264,700 discloses a suspension polymerization method of encapsulation of solid toner particles, wherein the toner particles are suspended in an aqueous phase and the monomer is dissolved in the organic phase. The monomer is emulsified in order to allow migration of the monomer through the aqueous phase and polymerize at active sites on the toner particles. This method also involves certain complexity and requires investigation of the appropriate conditions and materials to accomplish the suspension polymerization and the encapsulation.

U.S. Pat. Nos. 4,439,510 and 4,447,516 disclose a method of encapsulating toner particles useful in electrostatography using interfacial polycondensation techniques. The toner particles, such as magnetite or carbon black, are suspended in a paraffinic solvent containing a stabilizer such as lecithin or polyvinyl alcohol. A reactive compound such as an acid chloride, for instance, terephthaloyl chloride, is also dissolved in the paraffinic solvent. An aqueous solution of a reactive amine, such as diethylene triamine, is added to the paraffinic suspension and stirred. The interfacial polycondensation between the acid chloride and the amine results in the formation of a polyamide coating on the toner particles. This method also involves the complexity of determining the appropriate conditions for forming the suitable encapsulating polymer for each type of particle. Moreover, this method involves the use of corrosive acid chlorides, harmful amines and volatile solvents.

U.S. Pat. No. 4,665,107 discloses a process for modifying colorants suitable for preparing writing fluids, textile coloration fluids, and cosmetic compositions, which comprises modifying the surface of an active ingredient of solid primary particles in the submicron range by encapsulating with polymeric starting materials that are not substantially altered during the process. For instance, the process of preparing a writing fluid containing colorant latex is as follows. An organic solvent such as methylene chloride containing a small portion of 2-amino-2-methyl-1-propanol is mixed with an alkylated vinylpyrrolidone copolymer, and a water insoluble colorant is dispersed into the mixture. A separate water mixture containing water, an anionic surfactant, and a styrene maleic anhydride resin is prepared. The organic solvent mixture is then emulsified into the water mixture. The organic solvent is removed from the emulsion by evaporation to produce a colorant encapsulated latex having about 8% polymer, 2% colorant, and 89% water. The above process does not disclose an encapsulated colorant suitable for digital duplicating and moreover utilizes volatile organic solvents such as methylene chloride which is considered harmful to the environment.

Co-pending and commonly owned U.S. patent applications Ser. No. 08/267,039, filed Jun. 27, 1994, and U. S. Ser. No. 08/447,683, filed May 23, 1995, disclose certain encapsulated pigments suitable for use in printing inks and in magnetic recording media. The pigment is encapsulated by a composition comprising a vegetable oil such as soya oil and optionally an ionomer such as polyethylene-acrylic acid copolymer. The applications, however, are not directed to the preparation of water-in-oil emulsion inks suitable for use in digital duplicators.

From the foregoing, it is clear that there exists a need for water-in-oil emulsion inks that produce high color strength, high image density, good image resolution, low set-off, low "bleed through" excellent runnability, and better environmental stability.

A need therefore exists for a water-in-oil emulsion ink suitable for use in digital duplicators that offers high color strength, high image density, good image resolution, low set-off, low "bleed through", excellent runnability, and better environmental stability.

A need also exists for an encapsulated colorant suitable for the preparation of the water-in-oil emulsion inks of the present invention.

SUMMARY OF THE INVENTION

The aforementioned needs have been fulfilled by the water-in-oil emulsion ink of the present invention.

Thus the present invention provides a water-in-oil emulsion ink comprising an oil phase and a water phase, the oil phase comprising an encapsulated colorant, an oil phase oil, a surface active agent, and a film-forming component, and the water phase comprising water.

The present invention also provides an encapsulated colorant comprising a colorant, at least one binder resin, a saturated oil, a viscosity adjusting agent, and an adhesion promoter.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides water-in-oil emulsion ink formulations suitable for use in digital duplicators that offer high color strength, high image density, good image resolution, low set-off, low "bleed through", excellent runnability, and better environmental stability.

The water-in-oil emulsion ink formulation of the present invention comprises an oil phase and a water phase, the oil phase comprising an encapsulated colorant and a film-forming component, and the water phase comprising water.

The emulsion ink formulation of the present invention can be prepared by any suitable method. It is preferably prepared in two steps. An encapsulated colorant is prepared in the first step and the water-in-oil emulsion ink is prepared in the second step.

The encapsulated colorant comprises a colorant having a particle size of from about 0.01 microns to about 25 microns, an adhesion promoter, and at least one binder resin selected from the group consisting of a hydrocarbon modified rosin ester and a phenol modified hydrocarbon resin.

The encapsulated colorant can be prepared by any suitable method. It is preferably prepared by combining a suitable colorant with an oil component, a binder resin component, and preferably an adhesion promoter and a disperser vehicle. The components of the encapsulated colorant are combined sequentially and mixed in a suitable mixer or blender until a uniformly mixed encapsulated colorant is produced. A detailed discussion of the various components of the encapsulated colorant is set forth below.

COLORANTS

Any colorant that is insoluble in the oil phase can be encapsulated by the method of the present invention. Any suitable colorant can be used. The colorant may be a dye or a pigment. The colorant may be organic or inorganic. Examples of suitable colorants include C.I. Blue 15:3, available as Process Blue Pigment 249-2083 from Sun Chemical Corp., and the C.I. Green 7, available as Green Pigment 264-8142 from Sun Chemical Corp., C.I. Violet 1, which is a Rhodamine B PTMA type pigment and available from Magruder Color Company in Elizabeth, N.J., as MM 0107-DC, and carbon black. The types of carbon black include Channel black, furnace black, and lamp black. Any suitable carbon black can be used in the preparation of the encapsulated colorant of the present invention. Preferably, the carbon black has a BET surface area of from about 20 square meters per gram to about 600 square meters per gram, and a dibutylphthalate (DBP) oil absorption of from about 20 cc/100 gm to about 200 cc/100 gm. MONARCH™ 120, MONARCH 280, REGAL™ 250R, and REGAL 350R from Cabot Corporation are examples of preferred carbon black colorants. MONARCH 120 is a lamp type carbon black having a particle size of 0.075 microns, a BET surface area of 25 square meters per gm, and a DBP oil absorption of 64 cc/100 gm. MONARCH 280 is a lamp type carbon black having a particle size of 0.045 microns, a BET surface area of 42 square meters per gm, and a DBP oil absorption of 121 cc/100 gm. REGAL 250R has a particle size of 0.035 microns, a BET surface area of 50 square meters per gm, and a DBP oil absorption of 46 cc/100 gm. REGAL 350R is a blue-toned carbon black.

Examples of other suitable colorants include metallized azo reds such as Red 49:1 (barium salt), Red 49:2 (calcium salt), Red 63:1 (calcium salt), toluidine reds, naphthol reds, pyrazalones, rhodamines, quinacridones such as Red B, Red Y, Magenta B, Magenta and Violet, phthalocyanine blues, phthalocyanine greens, carbazole yellow, monoarylide yellow, diarylide yellow, chrome yellow, red lake C, lithol reds such as calcium and barium salts, lithol rubine, bon maroon, perylene pigments, Red 2B pigments including the calcium, barium and magnesium salts, chrome yellow, chrome orange, molybdate orange, lead chromes, lead silicochromates, zinc chromes, barium chromate, strontium chromate, titanium nickel yellow, liminites, haematite, magnetite, micaceous oxides of iron, siderite, iron pyrites, ferrite yellow, red oxide, prussian blue, Orange 36, diarylide orange, dianisidine orange, tolyl orange, and dinitraniline orange.

The colorant may be present in the encapsulated colorant in any suitable amount. It is generally present in an amount of from about 20% to about 50% by weight of the encapsulated colorant, and preferably in an amount of from about 30% to about 45% by weight, and more preferably in an amount of from about 35% by weight to about 40% by weight. Excessive use of the colorant may lead to poor dispersion, resulting in poor quality images such as blurred images.

The colorant can have any suitable particle size, including a particle size of from about 0.01 microns to about 25 microns, preferably from about 0.01 microns to about 5 microns, and more preferably from 0.01 microns to 2 microns.

OIL COMPONENT

The encapsulated colorant comprises one or more oils. Any suitable oil, including saturated and unsaturated, can be used. The saturated oil preferably has a boiling point of from about 280° C. to about 420° C. and a viscosity of from about 300 Saybolt Universal Standard (SUS) to about 2400 SUS at 100° F. Examples of suitable saturated oils include aromatic, naphthenic, and paraffinic oils. Examples of suitable aromatic oils include FLEXON™ 340 and FLEXON on 391, SUNDEX® 790 and SUNDEX 8600T, and TUFFLO® 491. Examples of naphthenic oils include CIRCOSOL™ 450, CIRCOSOL 4240, CIRCOSOL 5600, SUNTHANE™ 450, SUNTHANE 4240, FLEXON 676, FLEXON 766, TUFFLO 500, TUFFLO 750, TUFFLO 2000, TUFFLO 6024, and examples of paraffinic hydrocarbon include SUNPAR 150, SUNPAR 2280, FLEXON 815, FLEXON 865, TUFFLO 60 and TUFFLO 80. A preferred oil is TUFFLO 2000, which has a viscosity of 2117 SUS at 100° F., boiling point of 320° C., an acid number of 0.05 mg KOH/g, and a color index of 2.5. TUFFLO brand oils are available from EMCO Chemical Distributors, Inc. in Northbrook, Ill., CIRCOSOL, SUNTHANE, SUNPAR, and SUNDEX brand oils are available from Sun Oil Co., in Amelia, Ohio.

Examples of suitable unsaturated oils include ground nut, cashew nut, castor, chia, corn (maize), cotton seed, hemp, linseed, lumbang, niger seed, oiticia, perilla, poppy, po-yok, safflower, soya, stillingia, sunflower, tobacco seed, tung, and walnut oils, and combination thereof, with the soybean oil and linseed oil being examples of preferred oils.

The oil may be used in any suitable amount. It is typically used in an amount of from about 10% by weight to about 60% by weight of the encapsulated colorant, and preferably in an amount of from about 20% by weight to about 45% by weight of the encapsulated colorant. Excessive use of the oil will increase drying times undesirably.

The oil component may also include one or more of viscosity adjusting agents such as low viscosity aliphatic oils, naphthenic oils, and tall oil fatty esters. The viscosity adjusting agents preferably have a viscosity of from about 3.0 CST @ 104° F. (or 36 SUS @ 100° F.) to about 4.0 CST @ 104° F. (or 39 SUS @ 100° F.), and more preferably a viscosity of from about 3.4 to about 3.6 CST @ 104° F.

Mineral seal oil, a preferred viscosity adjusting agent and available from EMCO Chemical Distributors, Inc., is an aliphatic oil having a boiling point of 250° C., an acid number of 0.01 mg KOH/g, and a viscosity of 3.53 CST @ 104° F.

If a zero-VOC ink formulation is desired, higher boiling viscosity adjusting agents may be utilized. For instance, tall oil fatty acid esters such as $C_1$–$C_8$ alkyl and mono-, di- and trialkylene glycol esters of tall oil fatty acids, can be used as the viscosity adjusting agents. Several tall oil fatty acid esters are commercially available. For example, NIREZ® brand tall oil fatty acid esters are available from Arizona Chemical Company Co. in Panama City, Fla. Suitable NIREZ brand tall oil esters include NIREZ 9011, which is a methyl ester of tall oil fatty acid and has a Brookfield viscosity of 7 centipoises (cps), an acid number of 5 mg KOH/g, an iodine value of 105 minutes (Wijs), and a EPA-24 volatiles content of 8% NIREZ 9012, which is a butyl ester of tall oil fatty acid and has a Brookfield viscosity of 7 cps, an acid number of 2 mg KOH/g, an iodine value of 110 minutes, and a EPA-24 volatiles content of 2%, NIREZ 9015, which is a butyl ester of tall oil fatty acid and has a Brookfield viscosity of 8 cps, an acid number of 14 mg KOH/g, an iodine value of 112 minutes, and a EPA-24 volatiles content of 2%, NIREZ 9007, which is a 2-ethylhexyl ester of tall oil fatty acid and has a Brookfield viscosity of 14 cps, an acid number of less than 1 mg KOH/g, an iodine value of 97 minutes, and a EPA-24 volatiles content of less than 1% NIREZ 9017, which is a diethylene glycol ester of tall oil fatty acid and has a Brookfield viscosity of 37 cps, an acid number of 8 mg KOH/g, an iodine value of 110 minutes, and a EPA-24 volatiles content of less than 1%, NIREZ 9014, which is a methyl ester of tall oil fatty acid and has a Brookfield viscosity of 15 cps, an acid number of 5 mg KOH/g, an iodine value of 73 minutes, and a EPA-24 volatiles content of 8%. NIREZ 9012 is a preferred tall oil fatty acid ester.

The viscosity adjusting agent may be used in any suitable amount in the preparation of the encapsulated colorant. When used, the viscosity adjusting agent is generally used in an amount of from above 0% by weight to about 25% by weight, and preferably in an amount of from about 8% by weight to about 12% by weight of the encapsulated colorant. Excessive use of the viscosity adjusting agent will result in too low of a viscosity and a yield value of the ink that produces a poor image resolution and poor runnability.

BINDER RESINS

The encapsulated colorant comprises one or more binder resins. Preferably, the encapsulated colorant comprises a first binder resin and a second binder resin. The first binder resin may be any agent that is capable of forming a coating on the colorant, preferably a polymeric resin that is soluble in the oils. The first binder resin advantageously has a moderate melting point, preferably in the range of 100° C. to 160° C. A preferred first binder resin is a rosin ester. A more preferred first binder resin is a hydrocarbon modified rosin ester, the hydrocarbon component imparting oil solubility, especially aliphatic oil solubility. Examples of suitable hydrocarbon modified rosin esters include the RESINALL™ resins such as RESINALL 511, 514, 519, 521, 524, 526, and 529 resins, available from Resinall Corporation in Stamford, Conn. RESINALL 511 has a melting point of about 130° C. RESINALL 519 has a melting point of about 140° C., RESINALL 521 and 524 have a melting point of about 155° C. and RESINALL 529 has a melting point of about 145° C. The RESINALL 514 resin, a further preferred resin, has a melting point of about 125° C. (±5° C.), an acid number of maximum 25 mg KOH/g (ASTM D-974), a color index (Gardner 60% toluene) of 11 (ASTM D-1544), and a Gardner (50 wt. % resin in MAGIESOL™ 47 oil, Magie Bros. Oil Co., a Division of Pennzoil Products Co.) line-to-line viscosity of 30 seconds at 25° C. (ASTM D-1545).

Examples of other suitable first binder resins include phenolics and modified phenolics such as p-phenylphenol resins, p-tertiarybutylphenol resins, and p-octylphenol resins, polyolefin resins such as polypropylene resins such as the REXTAC™ polymer resins available from Rexene Co. in Odessa, Tex., polyethylene, polyisobutylene, and copolymers of ethylene, propylene, butylene, or hexene, tall oil resins, polyterpene resins, hydrocarbon modified terpene resins, polystyrene resins, polyacrylic resins having long hydrocarbon chains, and the like. Examples of REXTAC resins include REXTAC 2115, which is a polypropylene homopolymer having a melting point of 152° C., REXTAC 2535, which is a polypropylene copolymer having ethylene as a comonomer and melting at 129° C. REXTAC 2304, which is also a polypropylene copolymer having ethylene comonomer and melting at 138° C. and REXTAC 2715, which is a polypropylene copolymer having butene as comonomer and melting at 110° C.

Any suitable amount of the first binder resin can be used. Typically, the first binder resin is present in the encapsulated colorant in an amount of from about 2% by weight to about 10% by weight, preferably in an amount of from about 4% by weight to about 8% by weight, and more preferably in an amount of from about 5% by weight to about by weight of the encapsulated colorant. Excessive use of the first binder resin will decrease the colorant loading in the ink formulation and therefore affect the color density and print quality.

Along with the aforesaid first binder resin, a second binder resin may be used to enhance the dispersability of the colorant and thereby allow higher colorant loadings in colorant dispersions. The second resin may also increase the tackiness and adhesion of the encapsulated colorant to paper and other printing surfaces. The second resin may also improve the adhesion of the first binder resin to the colorant.

Any of the aforesaid first binder resins may be used also as the second binder resin. It is preferred that the second resin is compatible with the first binder resin and is soluble in the oils used to prepare the encapsulated colorant. The second binder resin is preferably a hydrocarbon resin. A further preferred second binder resin is a modified hydrocarbon resin, for example, a phenol modified hydrocarbon resin. The phenol modifier may be an unsubstituted or substituted phenol or naphthol, wherein the substituents are 1–3 substituents which may be the same or different and selected from the group consisting of alkyl groups of 1–3 carbon atoms, fluoro, chloro, bromo, iodo, amino, cyano, and nitro groups. The phenol modified hydrocarbon resin preferably has a softening point of from about 100° C. to about 160° C., and more preferably, from about 130° C. to about 150° C. The phenol modifier is preferably present in the modified resin in an amount of from about 2% by weight to about 10% by weight, and more preferably in an amount of from about 3% by weight to about 5% by weight of the modified resin.

An example of a preferred second binder resin is LX-2000™ available from Neville Chemical Co., in Pittsburgh, Pa. LX-2000 is particularly suitable for use along with RESINALL 514. LX-2000 is a phenol modified hydrocarbon resin having a softening point of 140° C. (ASTM E-28), an acid number of less than 1 mg KOH/g (ASTM D-974), a color index (Gardner 60% toluene) of 12 (ASTM D-1544), a specific gravity at 25° C. of 1.090 (ASTM D-71), and a Gardner-Holdt viscosity at 25° C. (50 wt. % resin in Magiesol 47 oil) of 5–6 seconds (ASTM D-1545). The phenol content of LX-2000 is believed to be held as a trade secret.

Any suitable amount of the second binder resin can be used. The second binder resin is typically used in an amount of from about 1% by weight to about 10% by weight of the encapsulated colorant, preferably in an amount of from about 2% by weight to about 6% by weight, and more preferably in an amount of from about 3% by weight to about 5% by weight of the encapsulated colorant. Excessive use of the second resin will unacceptably increase the viscosity of the encapsulated colorant and reduce encapsulation efficiency.

Thus the present invention provides an encapsulated colorant comprising a colorant having a particle size of from about 0.01 microns to about 25 microns and a binder resin selected from the group consisting of a hydrocarbon modified rosin ester and a phenol modified hydrocarbon resin.

ADHESION PROMOTER

The encapsulated colorant may further comprise an adhesion promoter. The adhesion promoter may be any component that is capable of assisting the formation of a coating on the colorant, preferably a polymeric material that is insoluble in water but is soluble or dispersible in the oils used to prepare the encapsulated colorant. The adhesion promoter in combination with the disperser vehicle (described later) prevents agglomeration of the colorant particles. It is further preferred that the adhesion promoter is a polymeric agent that is solid at 25° C., melts below about 150° C., and miscible or compatible with the oil component.

Examples of suitable polymeric adhesion promoters include oxidized polyethylenes. Any suitable oxidized polyethylene can be used. The oxidized polyethylenes typically have an acid number of from about 5 to about 40 mg KOH/g, and preferably from about 10 to about 30 mg KOH/g, and more preferably from about 14 to about 20 mg KOH/g. The oxidized polyethylenes typically have a Mettler Drop Point (ASTM D-395a) of from about 80 to about 120° C. and preferably from about 85° to about 110° C. Oxidized polyethylenes are commercially available, for instance, as AC™ polyethylenes from AlliedSignal, Inc. in Morristown, N.J. AC polyethylenes, which are low molecular weight oxidized polyethylenes having certain polar functions such as carboxyl, are available in a range of molecular weights and acid numbers. Examples of preferred AC polyethylenes suitable for use in the present invention include AC 316, 316A, 325, 330, 392, 395, 395A, 629, 655, 656, 680 and 6702, with AC 656 and 6702 being further preferred examples of the AC polyethylenes. AC 656 has an acid number of 15 mg KOH/g and a Mettler Drop Point of 98° C., and AC 6702 has an acid number of 16 mg KOH/g and a Mettler Drop Point of 88° C.

The exact mechanism by which the adhesion promoter assists in the formation of the coating has not been fully understood. It is believed that the polar groups present on the adhesion promoter such as oxidized polyethylene may be involved in promoting the adhesion. For instance, the oxygenated groups on oxidized polyethylene may interact with the colorant, especially a colorant such as carbon black, through the polar groups present on the colorant. The interaction may be by any known mechanism, including chemical forces such as the formation of an ionic or covalent bond, and physical forces such as van der Waals interactions such as dipole-dipole interactions and dipole-induced dipole interactions, hydrogen bonding interactions, acid-base interactions, and donor-acceptor interactions. It is also believed that one or more of such interactions may be present among the binder resins and the adhesion promoter.

Any suitable amount of the adhesion promoter can be used. The adhesion promoter is generally present in the encapsulated colorant in an amount sufficient to coat or modify the surface of all colorant particles. The adhesion promoter is used preferably in an amount of from about 0.5% by weight to about 6% by weight of the encapsulated colorant, and more preferably in an amount of from about 1% by weight to about 4% by weight of the encapsulated colorant. Excessive use of the adhesion promoter may result in poor printer runnability and diminished color strength.

Thus the present invention provides an encapsulated colorant comprising a colorant having a particle size of from about 0.01 microns to about 25 microns, an adhesion promoter, and a binder resin selected from the group consisting of a hydrocarbon modified rosin ester and a phenol modified hydrocarbon resin.

DISPERSER VEHICLE

The encapsulated colorant may preferably include a disperser vehicle. The disperser vehicle functions to wet the colorant particles and thus prevent flocculation of the particles. The disperser vehicle preferably has a viscosity in the range of from 2'–4'30" inches at 100° F. (bubble tube). In addition, the disperser vehicle is believed to help promote increased loading of colorant. The disperser vehicle may also increase the gloss of the colorant.

Any suitable disperser vehicle can be used. The disperser vehicle typically has a viscosity of from about 2' to about 5', at 100° F. (bubble tube), and preferably from about 3' to about 4', at 100° F. (bubble tube). Examples of suitable disperser vehicles include PRIMEX SSF™ and UROSET FGV™, which are available from Lawter International, Inc. PRIMEX SSF has a viscosity of 3'–3'30" at 100° F. (bubble tube), a boiling range of 510° F. to 610° F., an acid number of 14 mg KOH/g, an inkometer tack of 23–25 at 400 rpm, 30 inches, at 90° F., and a color index of 15. UROSET FGV has a viscosity of 3'30"–4' at 77° F. (bubble tube), a boiling range of 510° F. to 610° F., an acid number of 10 mg KOH/g, an inkometer tack of 8–9 at 400 rpm, 30 inches, at 90° F., and a color index of 15.

Any suitable amount of the disperser vehicle can be used. When used, the disperser vehicle is used in an amount of from above 0% to about 20% by weight of the encapsulated colorant, and preferably in an amount of from about 4% by weight to about 15% by weight of the encapsulated colorant. In relation to the colorant, the disperser vehicle is used preferably in an amount of from about 4% by weight to about 100% by weight of the colorant, and more preferably in an amount of from about 10% by weight to about 50% by weight of the colorant. If lower amounts of disperser vehicle is used, the colorant particles may not be completely wetted and the resulting dispersion may have undesirable agglomeration of colorant particles.

The encapsulated colorant may be prepared by using aforesaid ingredients by any suitable method known to those of ordinary skill in the art. A preferred method is described below. The chosen oil(s) and the binder resins are combined in a suitable mixer such as the HIDROBAT-10™ mixer from Premier Mill Corp., Reading, Pa., and stirred until complete dissolution is obtained. The stirring may be maintained for a period of from about 30 minutes to about two hours, at a temperature of from about 130° C. to about 180° C. and preferably for a period of about an hour at about 160° C. The temperature is then reduced to about 120° C. to about 140° C., preferably to about 130° C., and then the adhesion promoter is added. Mixing is continued for a period of from about 10 minutes to about 30 minutes, and preferably for a period of about 20 minutes. The viscosity adjusting agent is then added, and the mixing is continued for a period of from about 5 minutes to about 15 minutes, preferably for a period of about 10 minutes. The temperature is then reduced to about 100° C. to about 120° C., preferably to about 110° C., and the colorant is added slowly with mixing over a period of from about 10 minutes to about 20 minutes, and preferably for about 15 minutes. The mixing is continued further for a period of about 20 minutes to about 40 minutes, preferably for about 30 minutes, after the addition of the colorant to obtain the encapsulated colorant.

The water-in-oil emulsion ink of the present invention can be prepared by any suitable method. It is advantageously prepared by combining the encapsulated colorant with suitable oil phase components and water phase components.

The oil phase components include the encapsulated colorant, one or more oils, a surface active agent, and a film-forming component. The oil phase may optionally comprise other additives such as a rheological additive and an anti-skinning agent. The water phase components include water and a biocide. The water phase may optionally comprise other additives such as a thickening agent and a humectant.

The oil phase can be prepared by mixing the aforesaid components and any optional additives in a suitable blender or mixer. The water phase can be prepared by mixing the appropriate components. The two phases are then mixed together to obtain the water-in-oil emulsion. A detailed discussion of the components of the inventive water-in-oil emulsion ink is set forth below.

ENCAPSULATED COLORANT

Any suitable amount of the aforedescribed encapsulated colorant can be used in the preparation of the inventive ink. It is typically used in an amount of from about 5% by weight to about 50% by weight of the ink, and preferably in an amount of from about 7% by weight to about 35% by weight of the ink. Excessive use of the encapsulated colorant will adversely affect the image quality, for instance, the image resolution will decrease and image set-off will increase.

THE OIL PHASE OIL COMPONENT

Any suitable oil or a combination of oils can be used as the oil phase oil component. Examples of suitable oils include naphthenic oils and drying oils.

Any suitable naphthenic oil can be used. The naphthenic oil used typically has a viscosity of from about 50 SUS to about 500 SUS @ 100° F. (ASTM D2161), an API gravity index (ASTM D287) of from about 10 to about 50, and an aniline point (ASTM D611) of from about 50° C. to about 150° C. An example of a suitable naphthenic oil is HYDROCAL™ 300, available from Calumet Lubricants Co. in Princeton, La. HYDROCAL 300 has a viscosity of 313.9 SUS @ 100° F. (ASTM D2161), an API gravity index (ASTM D287) of 25, and an aniline point (ASTM D611) of 94° C.

Any suitable drying oil can be used. Examples of suitable drying oils include mineral seal oil, fatty acids such as tall oils, and tall oil fatty $C_1$–$C_8$ acid $C_1$–$C_8$ alkyl esters. Mineral seal oil is preferred if a non-zero VOC version of the ink is desired, and NIREZ 9012 is preferred if a zero-VOC version of the ink is desired. Any suitable fatty acid can used. Suitable fatty acids typically have an acid number of from about 150 to about 220 mg KOH/g, and preferably from about 180 to about 200 mg KOH/g. The fatty acids have an iodine value of from about 110 to about 150 minutes, and preferably from about 120 to 140 minutes. Examples of suitable fatty acids include the PAMAK™ brand fatty acids available from Hercules, Inc. in Wilmington, Del. PAMAK 1, a preferred fatty acid, has an acid number of 194 mg KOH/g and an iodine value of 130 minutes.

Examples of other drying oils suitable for use in the present invention include those obtained from ground nut, cashew nut, castor, chia, corn (maize), cotton seed, hemp, linseed, lumbang, niger seed, oiticia, perilla, poppy, poyok, safflower, soya, stillingia, sunflower, tobacco seed, tung, and walnut, with tung oil being a preferred drying oil. Tung oil, which can be obtained from Kraft Chemical Co. in Melrose Park, Ill., has a specific gravity of 0.933 to 0.938 g/cc, an acid number of 5.0 mg KOH/g maximum, a saponification value of 189–195 mg KOH/g, an iodine value of 163 minutes, a gel time of 12 minutes maximum, and a refractive index of 1.5160 to 1.5200 at 25° C.

The oil phase oil component can be used in the oil phase in any suitable amount. It is typically used in an amount of from about 3% by weight to about 30% by weight of the ink, preferably in an amount of from about 5% by weight to about 25% by weight, and more preferably in an amount of from about 6% by weight to about 23% by weight of the oil phase. Excessive amounts of oil is to be avoided because the excess oil will reduce the viscosity and yield value of the ink thereby causing it to diffuse through the paper and make it transparent and also give poor runnability (e.g. cylinder leakage).

SURFACE ACTIVE AGENT

The oil phase may preferably include a suitable surface active agent to facilitate and stabilize the emulsion. The surface active agent may also reduce the surface tension energy of the oil phase, thereby increasing the drying rate of the ink. Any suitable surface active agent may be used, including anionic, cationic, nonionic, amphoteric surface active agents, and combinations thereof. Nonionic surface active agents are preferred. Examples of suitable nonionic surface active agents include fatty acid esters of sorbitan such as sorbitan monooleate, sorbitan monopalmitate, sorbitan monostearate, sorbitan tristearate, sorbitan sesquioleate, sorbitan trioleate, sorbitan monolaurate, sorbitan dilaurate, sorbitan trilaurate, and fatty acid triglycerides such as oleic acid monoglyceride, oleic acid diglyceride, polyethylene oxide adducts of fatty acids such as polyoxyethylene monolaurate, polyoxyethylene monostearate, polyoxyethylene monooleate, and ethylene oxide adducts of alkyl phenols and higher alcohols. Several of the surface active agents are available from common chemicals suppliers, including Aldrich Chemical Co. in Milwaukee, Wis. Sorbitan monooleate, a preferred surface active agent, is also available from EMCO Chemical Distributors, Inc.

The surface active agent can be used in any suitable amount. It is typically used in the oil phase in an amount of from about 0.5% by weight to about 5% by weight of the ink, and preferably in an amount of from about 1% by weight to about 3% by weight of the ink. Excessive use of the surface active agent is to be avoided because the excess surface active agent will diffuse through the paper and make it transparent, and destabilize the emulsion.

FILM-FORMING COMPONENT

The oil phase preferably comprises a film-forming component. The film-forming component rapidly forms a tough and durable film on the colorant particle, immobilizes the colorant on the paper, and helps produce images of high color strength and good image resolution. Any suitable film-forming component compatible with the oil phase oils may be used as the film-forming component. Examples of suitable film-forming components are hydrocarbon resins such as polyolefin resins and terpene resins, polyester resins such as alkyd resins, and unsaturated polyester resins such as the resins prepared from the condensation polymerization of a glycol such as 1:2-propylene glycol or 1:3-butylene glycol with an unsaturated acid such as maleic acid.

Any suitable terpene resin can be used. Suitable terpene resins include those having a number average molecular weight (Mn) of from about 500 to 5,000, and preferably those having an Mn of from about 600 to about 1000. It is further preferred that the terpene resin has a melting point or softening point of from about 80° C. to about 150° C. and it is further preferred that the terpene resin has a melting point or softening point of from about 100° C. to about 140° C. Examples of suitable terpene resins include PICCOLYTE™ 115 and PICCOLYTE 135, which are available from Hercules, Inc. in Wilmington, Del. PICCOLYTE 115 has a softening point of 115° C. (Ring and Ball or R&B), a glass transition temperature of 59° C. (onset), a Mn of 625, a Mw/Mn of 1.8, and an acid number of 0.0 mg KOH/g. PICCOLYTE 135 has an R&B softening point of 131° C., a glass transition temperature of 81° C. (onset), a Mn of 750, and a Mw/Mn of 1.6.

Alkyd resins are fatty acid esters of drying oils such as the unsaturated oils obtained from ground nut, cashew nut, castor, chia, corn (maize), cotton seed, hemp, linseed, lumbang, niger seed, oiticia, perilla, poppy, poyok, safflower, soya, stillingia, sunflower, tobacco seed, tung, and walnut. It is known to those of ordinary skill in the art that unsaturated fatty acids present in the aforesaid drying oils include linolenic acid, linoleic acid, oleic acid, and ricinoleic acid.

The alkyd resins can be prepared by any method known to those of ordinary skill in the art including, for example, by esterification or ester interchange reaction of a mixture of the fatty acid, a polybasic acid, and a polyhydric alcohol. Examples of suitable polybasic acids include the compounds having 2 to 4 carboxyl groups or methyl carboxylate groups per molecule such as phthalic acid or anhydride, isophthalic acid, terephthalic acid, maleic acid or anhydride, fumaric acid or anhydride, pyromellitic acid or anhydride, trimellitic acid or anhydride, benzene tetracarboxylic dianhydride, succinic acid or anhydride, sebacic acid, azelaic acid, dodecanedicarboxylic acid, dimethyl isophthalate, dimethyl terephthalate, and the like, and combinations thereof. Examples of suitable polyhydric alcohols include ethylene glycol, propylene glycol, propane triol, glycerol, neopentyl glycol, 1,6-hexanediol, trimethylolpropane, sorbitol, tricyclodecanedimethanol, and pentaerythritol.

By way of illustration, suitable amounts of phthalic anhydride and glycerol are heated to 180° C. to the "first stage" syrup having residual or free hydroxyl groups, and molten fatty acids are added to esterify the free hydroxyl groups. Heating is continued at 180° C. to 220° C. until the desired acid number and solubility characteristics are reached.

In an alternative method, the three raw materials, phthalic anhydride, glycerol, and fatty acid are placed in a reaction vessel together with a small quantity of xylol. The vessel is fitted with a condenser to which is attached a water separator of the Dean Stark type. On heating, the water produced is carried off with the xylol and is separated. The condensing xylol serves to flush the sublimed phthalic anhydride back into the reaction vessel. The amount of water collected is an indication of the progress of esterification, but samples of the resin are removed from time to time and for acid number and viscosity checks.

The reaction vessels are generally of stainless steel fitted with stirrer, charge hole, condensing system, and pipes for passing inert gas over the charge. The latter serves to reduce discoloration. Heating can be provided by any known means including by immersion heaters, and by passing hot fluids such as hot liquid or gas through a jacket surrounding the vessel. An example of a hot liquid is a hot oil.

The necessity of isolating the fatty acids can be avoided in the preparation of glycerol type resins by the use of monoglycerides which are then further esterified with phthalic anhydride. The monoglycerides are formed by heating the drying oil with the necessary amount of glycerol to about 250° C. to about 280° C. when the fatty acid triglyceride undergoes alcoholysis to form the monoglyceride. The phthalic anhydride is added and the reaction completed at about 180° C. to about 250° C.

A preferred alkyd resin is a modified tall oil fatty acid ester that is capable of forming a fast-forming film on the encapsulated colorant during the duplicating process and provides a film that is tough and durable. Tall oil fatty acid is essentially linoleic acid, and is derived from wood-pulp. It is preferred that the tall oil is virtually free of rosin acids so that the tall oil fatty acid can be used to produce a resin which is non-yellowing and exhibits excellent gloss. It is further preferred that the modification comprises an aromatic polycarboxylic acid. It is believed that the aromatic moiety imparts toughness and durability to the film. Examples of suitable aromatic polycarboxylic acids include aromatic compounds having 2 to 4 carboxyl groups in the free acid, anhydride, or lower alkyl ester form per molecule, such as phthalic acid, phthalic anhydride, or alkyl phthalate ester, isophthalic acid, terephthalic acid, pyromellitic acid or anhydride, trimellitic acid or anhydride, and benzene tetracarboxylic dianhydride. An example of a preferred aromatic polycarboxylic acid is isophthalic acid. The aromatic polycarboxylic acid content of the modified alkyd resin is preferably in an amount of from about 1% by weight to about 20% by weight of the alkyd resin, and is more preferably in an amount of from about 5% by weight to about 15% by weight, and most preferably in an amount of from about 9% by weight to about 12% by weight of the alkyd resin. An example of a preferred alkyd resin is G-4495-100™, an isophthalic modified resin made from tall oil fatty acids, available from Ranbar Technology, Inc. in Glenshaw, Pa. The G-4495-100 resin has an isophthalic acid content of about 11% and an acid number of 8 mg KOH/g maximum.

The film-forming component can be used in any suitable amount. It is typically used in an amount of from about 2% by weight to about 16% by weight of the ink, preferably in an amount of from about 3% by weight to about 14% by weight of the ink, and more preferably in an amount of from about 4% by weight to about 13% by weight of the ink. Excessive use of the film-forming component will increase the viscosity of the ink undesirably, which in turn will adversely affect the image quality, for instance, the colorant strength may decrease and the ink drying time may increase.

OTHER ADDITIVES

In addition to the various components discussed above, the oil phase may advantageously contain one or more additives for improving the performance of the ink composition. Thus, the oil phase may contain additives such as a rheological additive and an antiskinning agent.

The rheological additive is used to provide several advantages including high gelling efficiency, yield, and viscosity, to prevent pigment agglomeration and settling, and to allow better control of tack and viscosity. The rheological additive also reduces ink misting, improves hiding, and reduces water pick up.

Any suitable rheological additive can be used. Examples of suitable rheological additive include organically modified clays such as organically modified kaolinite, montmorillonite, illinite, attapulgite, allophane, and halloysite clays. Any suitable organically modified clay can be used. Organically modified montmorillonite is a preferred organically modified clay. Any suitable organically modified montmorillonite clay can be used. The suitable organically modified montmorillonite clay preferably has a specific gravity of from about 1.5 to about 1.7 g/cc. An example of a suitable organically modified montmorillonite clay is CLAYTONE™ HY, available from Southern Clay Products, Inc. in Gonzales, Tex. CLAYTONE HY is a finely divided powder having a specific gravity of 1.6 g/cc, a dry particle size of −450 mesh, a moisture content of 2% by weight, and a weight loss of 43% at 1000° C.

The organically modified clay plays several key roles in improving the performance of the ink. Thus, the organically modified clay swells in the oil phase oil and holds the oil in place and thus prevents "bleed through" of the ink. It also prolongs the drying time of the wet printed image. This prolonged drying time allows sufficient time for the thermographic powder to be applied to the wet image, and for the subsequent passing of the image through the drying oven at 350° F. where the image is permanently set. Further, the organically modified clay and the cellulose derivative present in the water phase work together to provide a stable gel structure to the ink composition of the present invention, which allows excellent printer runnability, environmental storage stability, and provides low ink "bleed through", and high color development and image density. In addition, the organically modified clay also provides thixotropy, i.e., shear thinning property, to the ink composition.

The organically modified clay can be used in any suitable amount. It is advantageously used in an amount of from about 0.1% by weight to about 5% by weight of the ink, preferably in an amount of from about 1% by weight to about 3% by weight of the ink, and more preferably in an amount of from about 2% by weight to about 3% by weight of the ink. Excessive use of the organically modified clay may undesirably increase the viscosity and the drying time of the ink, which in turn can adversely affect the image quality such as rub resistance or smudge resistance.

The oil phase of the ink of the present invention may include an antiskinning agent. The antiskinning agent is used to prevent premature film formation by accidental exposure of the ink to the atmosphere, which film would contaminate the ink. The antiskinning agent works by complexing the active drier materials, thereby temporarily blocking the crosslinking until oven drying. Any suitable antiskinning agent can be used. Examples of suitable antiskinning agents include oximes such as aldoximes and ketoximes. Oxime antiskinning agents are commercially available from Hüls America, Inc. in Piscataway, N.J., as EXKIN™1 and EXKIN 2. EXKIN 1 is butyraldoxime and EXKIN 2 is methylethylketoxime. EXKIN 2 is a preferred antiskinning agent.

The antiskinning agent can used in any suitable amount. It is advantageously used in an amount of from about 0.01% by weight to about 1% by weight of the ink, preferably in an amount of from about 0.1% by weight to about 0.3% by weight of the ink, and more preferably in an amount of from about 0.15% by weight to about 0.25% by weight of the ink.

THE WATER PHASE

The water phase of the ink composition may optionally comprise certain ingredients such as thickening agents, biocides, and humectants.

WATER

Deionized water is preferably used in the preparation of the water phase of the ink composition, to avoid salt build up in the equipment due to drying of the ink. Water is used in an amount of from about 20% by weight to about 85% by weight, preferably in an amount of from about 25% by weight to about 80% by weight, and more preferably in an amount of from about 20% by weight to about 40% by weight of the ink of the present invention. Excessive use of the water may adversely affect the density of the image.

BIOCIDE

The water phase may preferably contain a suitable biocide to prevent growth of bacteria, mould or fungus in the ink. Methyl p-hydroxybenzoate (METHYL PARABEN) and 6-acetoxy-2,2-dimethyl-1,3-dioxane (available as GIV GARD DXN™ from Givaudam Corp.) are suitable biocides, with the latter being a preferred biocide. The biocide can be present in the ink of the present invention in an amount sufficient to prevent the attack by bacteria, mould, and fungus, which amount can be in the range of about 0.05% by weight to about 0.5% by weight, preferably in an amount of about 0.1% by weight of the ink.

THICKENING AGENT

The water phase may preferably contain a thickening agent. The thickening agent provides enhanced stability to the ink composition by forming a gel structure in association with certain components of the oil phase such as the rheological additive. The enhanced stability offers several advantages such as excellent printer runnability and long term storage stability. It also helps in obtaining high image density and color development of the printed image. In addition, the thickening agent also provides freeze-thaw stability to the water phase and to the ink composition.

Any suitable thickening agent can be used. Examples of suitable thickening agents include cellulose derivatives such as hydroxyalkylcellulose and alkyl hydroxyalkylcellulose, wherein the alkyl group has 1–6 carbon atoms, and preferably 2 carbon atoms.

The hydroxyalkylcellulose and alkyl hydroxyalkylcellulose can have any suitable hydroxyalkyl content. The hydroxyalkyl content is typically in the range of from about 1.5 to 2.6 moles per mole of the anhydroglucose unit, and preferably in the range of from about 1.9 to about 2.3 moles per mole of the anhydroglucose unit.

The "alkyl" hydroxylalkylcellulose derivative can have any suitable "alkyl" content. The "alkyl" content of the alkyl hydroxylalkylcellulose derivative is typically in the range of from about 0.5 to about 1.0 mole per anhydroglucose unit, and preferably in the range of from about 0.7 to 0.9 mole per anhydroglucose unit. It is to be understood that the maximum content of alkyl and hydroxyalkyl together cannot exceed 3.0 moles per mole of anhydroglucose units.

Hydroxyethylcellulose (HEC) and ethyl hydroxyethylcellulose (EHEC) are preferred examples of cellulose derivatives. Any suitable HEC or EHEC can be used. HECs and EHECs suitable for use in the ink composition of the present invention typically have a Brookfield viscosity (Type LV) of from about 200 mPa.s to about 100,000 mPa.s, when measured as a 2% solution in water at 20° C., and preferably in the range of from about 4,000 mPa.s to about 80,000 mPa.s, when measured as a 2% solution in water at 20° C.

Suitable examples of HEC include the CELLOSIZE™ brand HECs available from Hüls America, Inc. in Piscataway, N.J. Thus, CELLOSIZE brand QP 4400, QP 15,000, QP 30,000, QP 52,000, and QP 100,000 are examples of commercially available HECs, with QP 30,000 being a preferred HEC.

Suitable examples of EHEC include the BERMOCOLL™ E brand EHECs, available from Bero Nobel AB in Stennungsund, Sweden. Thus, BERMOCOLL brand E230, E270, E320, E351, E411, E431, E451, and E481 are examples of suitable EHECs. E230, E270, and E320 have an ethyl content of 0.8 mole per anhydroglucose unit and a hydroxyethyl content of 0.8 mole per anhydroglucose unit. E230, E270, and E320 have a Brookfield viscosity (Type LV) of respectively, 300±60, 700±150, and 2,200±450 mPa.s, when measured as a 2% solution in water at 20° C., at spindle speeds, respectively of 1–12, 2–12, and 3–12. E351, E411, E431, E451, and E481 have an ethyl content of 0.8 mole per anhydroglucose unit and a hydroxyethyl content of 2.1 mole per anhydroglucose unit. E351 has a Brookfield viscosity (Type LV) of 5,000±1,000 when measured as a 2% solution in water at 20° C., at a spindle speed of 3–12. E411, E431, E451, and E481 have a Brookfield viscosity (Type LV) of respectively, 1,000±200, when measured as a 1% solution in water at 20° C., at a spindle speed of 2–12, and 2,000±400, 3,000±600, and 5,000–1,000, when measured as a 1% solution in water at 20° C., at a spindle speed of 3–12.

Any suitable amount of the thickening agent can be used in the preparation of the ink. It is typically used in an amount of from about 0.5% by weight to about 3% by weight of the ink, and preferably in an amount of from about 1% by weight to about 3% by weight of the ink. Excessive use of the thickening agent will have adverse consequences such as instability of the ink.

HUMECTANTS

The water phase of the present inventive ink may preferably comprise a humectant which prevents the loss of water from the ink by evaporation. The humectant may also serve as an antifreeze agent. Any suitable humectant known to those of ordinary skill in the art can be used. As the humectant component, use can be made of aliphatic polyols, and preferably glycerin and alkylene glycols in which the alkylene group preferably contains 2–6 carbon atoms, as represented by ethylene glycol, propylene glycol, butylene glycol, hexylene glycol, and the polyalkylene glycols as represented by diethylene glycol, dipropylene glycol, triethylene glycol, tripropylene glycol, and tetraethylene glycol.

It is also possible to employ as humectant commercially available polyalkylene glycols such as Carbowax 200 or Carbowax 400, which are polyethylene glycols having average-molecular weights of bout 200 and 400, respectively. In general, it is preferred, when using polyalkylene glycols, to use those materials having an average molecular weight less than 600 since higher molecular weight polyalkylene glycols frequently serve to undesirably increase the viscosity of the ink composition.

Any suitable amount of the humectant can be used in the preparation of the ink. It is typically used in an amount of from about 1% by weight to about 5% by weight of the ink, and preferably in an amount of from about 2% by weight to 4% by weight of the ink. Excessive use of the humectant will increase the viscosity of the ink undesirably.

The ink composition of the present invention can have any suitable proportions of the oil and water phases. The ink composition typically contains the oil phase in a proportion of from about 20% by weight to about 80% by weight of the composition, preferably in a proportion of from about 40% by weight to about 80% by weight of the ink composition, and more preferably in a proportion of from about 60% by weight to about 80% by weight of the ink composition. Particularly, when the oil phase is in a proportion of from about 60% by weight to about 80% by weight of the composition, increased pigment loading and good flowability of the ink are obtained.

The following examples further illustrate the present invention but, of course, should not be construed as in any way limiting its scope.

EXAMPLE 1

This example illustrates the preparation of an embodiment of the encapsulated colorant. The following ingredients were used.

|  | Wt. % |
| --- | --- |
| TUFFLO 2000 oil | 30.0 |
| Mineral seal oil | 10.0 |
| RESINALL 514 Resin | 6.0 |
| LX 2000 Resin | 4.0 |
| AC 656 oxidized polyethylene | 2.0 |
| PRIMEX SSF disperser vehicle | 8.0 |
| MONARCH 120 carbon black | 40.0 |

The encapsulated colorant was prepared as follows. TUFFLO 2000, RESINALL 514, and LX 2000 were combined in a HIDROBAT-10 mixer, and stirred for one hour at 160° C. when the resins completely dissolved. The temperature was then reduced to 130° C. and AC 656 was added and mixed for about 20 minutes. PRIMEX SSF was then added and mixed for about 10 minutes. The temperature was then reduced to 110° C., the mineral seal oil was added and mixed, and MONARCH 120 was added slowly over a period of about 10 to about 20 minutes. The mixing was continued for about 30 minutes after the addition of carbon black to obtain the encapsulated colorant. Thus the present invention provides a method for preparing the encapsulated colorant comprising combining and mixing the aforesaid ingredients in a suitable mixing device.

EXAMPLE 2

This example illustrates the preparation of the encapsulated colorant using MONARCH 280 carbon black.

The encapsulated colorant was produced as in Example 1. The following ingredients were used.

|  | wt. % |
| --- | --- |
| TUFFLO 2000 | 30 |
| Mineral seal oil | 20 |
| RESINALL 514 | 8 |
| LX 2000 | 5 |
| AC 656 | 2 |
| MONARCH 280 | 35 |

EXAMPLE 3

This Example illustrates the preparation of an encapsulated colorant using a zero-VOC formulation. The encapsulated colorant was produced as in Example 1, except that NIREZ 9012 was used in place of the mineral seal oil.

EXAMPLE 4

This Example further illustrates the preparation of an encapsulated colorant using a zero-VOC formulation. An encapsulated colorant was produced as in Example 2, except that NIREZ 9012 was used in place of the mineral seal oil.

EXAMPLE 5

This Example illustrates the use of drying oils in the preparation of the encapsulated colorant. An encapsulated colorant was produced as in Example 1, using the following ingredients.

|  | wt. % |
| --- | --- |
| Soybean oil | 20 |
| Linseed oil | 17.5 |
| RESINALL 514 | 5 |
| LX 2000 | 6 |
| AC 6702 | 1.5 |
| PRIMEX SSF | 8 |
| Black pigment REGAL 350R | 42 |

EXAMPLE 6

This Example further illustrates the use of drying oils in the preparation of the encapsulated colorant. An encapsulated colorant was produced as in Example 1, using the following ingredients.

|  | wt. % |
| --- | --- |
| Soy bean oil | 24 |
| Linseed oil | 20 |
| RESINALL 514 | 7 |
| LX 2000 | 5 |
| AC 6702 | 2 |
| Process Blue pigment 2492083 | 42 |

EXAMPLE 7

This Example illustrates the use of the disperser vehicle, UROSET FGV, in the preparation of the encapsulated colorant. An encapsulated colorant was produced as in Example 1, using the following ingredients.

|  | wt. % |
| --- | --- |
| TUFFLO 2000 | 40 |
| RESINALL 514 | 7 |
| LX 2000 | 6 |
| UROSET FGV | 10 |
| AC 6702 | 2 |
| Purple pigment MM107DC | 35 |

EXAMPLE 8

This Example further illustrates the use of UROSET FGV in the preparation of the encapsulated colorant. An encapsulated colorant was produced as in Example 1, using the following ingredients.

|  | wt. % |
| --- | --- |
| Salad oil | 16 |
| Linseed oil | 16 |
| RESINALL 514 | 7 |
| LX 2000 | 5 |
| UROSET FGV | 14 |
| AC 656 | 2 |
| Green pigment 2648142 | 40 |

EXAMPLE 9

This example illustrates the preparation and performance of an embodiment of the water-in-oil emulsion ink of the present invention.

The following ingredients were used.

|  | wt. % |
|---|---|
| The oil phase | |
| Sorbitan monooleate | 2.0 |
| Mineral seal oil | 7.0 |
| G-4495-100 ™ | 6.0 |
| Encapsulated colorant from Example 1 | 18.0 |
| The water phase | |
| Water | 66.9 |
| GIV GARD DXN | 0.1 |

The ingredients of the oil phase, except the mineral seal oil, were combined and blended in a suitable blender and passed through a three-roll mill. The milled materials were then mixed with mineral seal oil in a suitable high shear mixer and the ingredients of the water phase were added slowly to form a water-in-oil emulsion ink. The kneading was continued until a uniform smooth emulsion ink was obtained. Thus the present invention provides a method of preparing the water-in-oil emulsion ink comprising the steps of mixing first the above ingredients of the oil phase in a suitable mixer and then adding the water phase to the oil phase with continued mixing in a suitable mixer.

The ink had a suitable viscosity and was found to be very stable. The ink was tested on the commercially available A.B. DICK 6000 Series (i.e., 6120, 6520, 6720, and 6770) Digital Duplicator and an improved quality printed image was obtained.

EXAMPLE 10

A water-in-oil emulsion ink was prepared and tested as in Example 9, using the encapsulated colorant of Example 2. The emulsion ink was found to provide improved image quality.

EXAMPLE 11

A water-in-oil emulsion ink was prepared and tested as in Example 9, using the encapsulated colorant of Example 3. The emulsion ink was found to provide improved image quality.

EXAMPLE 12

A water-in-oil emulsion ink was prepared and tested as in Example 9, using the encapsulated colorant of Example 4. The emulsion ink was found to provide improved image quality.

EXAMPLE 13

A water-in-oil emulsion ink was prepared and tested as in Example 9, except that NIREZ 9012 was used instead of the mineral seal oil. The emulsion ink was found to provide improved image quality.

EXAMPLE 14

A water-in-oil emulsion ink was prepared and tested as in Example 9, except that a tall oil fatty acid, PAMAK 1 was used instead of the mineral seal oil. The emulsion ink was found to provide improved image quality.

EXAMPLE 15

A water-in-oil emulsion ink was prepared and tested as in Example 9, except that a hydrotreated oil of viscosity 100 to 300 SUS @ 100° F. was used instead of the mineral seal oil. The emulsion ink was found to provide improved image quality.

EXAMPLE 16

A water-in-oil emulsion ink was prepared as in Example 14, except that NIREZ 9012 was used instead of the mineral seal oil. The emulsion ink, when tested as in Example 9, provided improved image quality.

EXAMPLE 17

A water-in-oil emulsion ink was prepared as in Example 11, except that NIREZ 9012 was used instead of the mineral seal oil. The emulsion ink, when tested as in Example 9, provided improved image quality.

EXAMPLE 18

A water-in-oil emulsion ink was prepared as in Example 12, except that NIREZ 9012 was used instead of the mineral seal oil. The emulsion ink, when tested as in Example 9, provided improved image quality.

EXAMPLE 19

A water-in-oil emulsion ink was prepared and tested as in Example 9, except that sorbitan monooleate was used at 1.0 wt. %. The emulsion ink was found to provide improved image quality.

EXAMPLE 20

A water-in-oil emulsion ink was prepared and tested as in Example 9, except that sorbitan monooleate was used at 4.0 wt. %. The emulsion ink was found to provide improved image quality.

EXAMPLE 21

A water-in-oil emulsion ink was prepared following the procedure set forth in Example 9, using the following ingredients. The emulsion ink was found to provide improved image quality.

|  | wt. % |
|---|---|
| The oil phase | |
| Sorbitan monooleate | 1.0 |
| Mineral seal oil | 4.0 |
| G-4495-100 | 5.0 |
| Encapsulated colorant from Example 1 | 10.0 |
| The water phase | |
| Water | 79.9 |
| GIV GARD DXN | 0.1 |

EXAMPLE 22

A water-in-oil emulsion ink was prepared following the procedure set forth in Example 9, using the following ingredients. The emulsion ink was found to provide improved image quality.

|  | wt. % |
|---|---|
| The oil phase | |
| Sorbitan monooleate | 3.0 |
| Mineral seal oil | 7.0 |
| G-4495-100 | 8.0 |
| Encapsulated colorant from Example 1 | 32.0 |
| The water phase | |
| Water | 49.9 |
| GIV GARD DXN | 0.1 |

EXAMPLE 23

A water-in-oil emulsion ink was prepared and tested as in Example 9, using the following ingredients. The emulsion ink was found to provide improved image quality.

|  | wt. % |
|---|---|
| The oil phase | |
| Sorbitan monooleate | 3.0 |
| Mineral seal oil | 3.0 |
| PICCOLYTE C115 (30 wt. %) | 8.4 |
| Encapsulated colorant from Example 1 | 15.6 |
| The water phase | |
| Water | 69.9 |
| GIV GARD DXN | 0.1 |

EXAMPLE 24

A water-in-oil emulsion ink was prepared and tested as in Example 9, using the following ingredients. The emulsion ink was found to provide improved image quality.

|  | wt. % |
|---|---|
| The oil phase | |
| Sorbitan monooleate | 2.0 |
| NIREZ 9012 | 4.0 |
| G-4495-100 | 3.6 |
| PICCOLYTE C115 (30 wt. %) | 3.6 |
| Encapsulated colorant from Example 1 | 16.8 |
| The water phase | |
| Water | 69.9 |
| GIV GARD DXN | 0.1 |

EXAMPLE 25

A water-in-oil emulsion ink was prepared and tested as in Example 9, using the following ingredients. The emulsion ink was found to provide improved image quality.

|  | wt. % |
|---|---|
| The oil phase | |
| CLAYTONE HY | 2.9 |
| Tung Oil | 6.5 |
| Mineral seal oil | 16.0 |
| Sorbitan monooleate | 3.0 |
| G-4495-100 | 13.4 |
| EXKIN 2 | 0.2 |
| Encapsulated pigment from Example 5 | 33.0 |
| The water phase | |
| water | 23.65 |
| CELLOSIZE HEC QP 30,000 | 1.25 |
| GIV GARD DXN | 0.1 |

EXAMPLE 26

A water-in-oil emulsion ink was prepared and tested as in Example 9, using the following ingredients. The emulsion ink was found to provide improved image quality.

|  | wt. % |
|---|---|
| The oil phase | |
| CLAYTONE HY | 2.9 |
| Tung oil | 6.5 |
| Mineral seal Oil | 5.0 |
| Sorbitan monooleate | 3.0 |
| PICCOLYTE C135 (30 wt. %) | 10.4 |
| EXKIN 2 | 0.2 |
| Encapsulated pigment from Example 5 | 30.0 |
| The water phase | |
| water | 27.65 |
| CELLOSIZE HEC QP 30,000 | 1.25 |
| Glycerin | 3.0 |
| GIV GARD DXN | 0.1 |

EXAMPLE 27

A water-in-oil emulsion ink was prepared and tested as in Example 9, using the following ingredients. The emulsion ink was found to provide improved image quality.

|  | wt. % |
|---|---|
| The oil phase | |
| CLAYTONE HY | 2.0 |
| Tung oil | 5.3 |
| Mineral seal oil | 13.5 |
| Sorbitan monooleate | 3.0 |
| G-4495-100 | 9.0 |
| EXKIN 2 | 0.2 |
| Encapsulated pigment from Example 5 | 27.0 |
| The water phase | |
| water | 35.8 |
| Cellosize HEC QP 30,000 | 1.1 |
| Glycerin | 3.0 |
| GIV GARD DXN | 0.1 |

EXAMPLE 28

A water-in-oil emulsion ink was prepared and tested as in Example 9, using the following ingredients. The emulsion ink was found to provide improved image quality.

|  | wt. % |
|---|---|
| The oil Phase | |
| CLAYTONE HY | 2.0 |
| HYDROCAL 300 Oil | 5.3 |
| Mineral seal oil | 13.3 |
| Sorbitan monooleate | 3.0 |

-continued

| | wt. % |
|---|---|
| PICCOLYTE C135 (30 wt. %) | 9.4 |
| Encapsulated pigment from Example 5 | 27.0 |
| The water phase | |
| water | 35.8 |
| CELLOSIZE HEC QP 30,000 | 1.1 |
| Glycerin | 3.0 |
| GIV GARD DXN | 0.1 |

EXAMPLE 29

A water-in-oil emulsion ink was prepared and tested as in Example 9, using the following ingredients. The emulsion ink was found to provide improved image quality.

| | wt.% |
|---|---|
| The oil phase | |
| CLAYTONE HY | 2.7 |
| Tung oil | 6.3 |
| Mineral seal oil | 12.8 |
| Sorbitan monooleate | 1.0 |
| G-4495-100 | 10.0 |
| EXKIN 2 | 0.2 |
| Encapsulated pigment from Example 8 | 27.0 |
| The water phase | |
| water | 38.65 |
| CELLOSIZE HEC QP 30,000 | 1.25 |
| GIV GARD DXN | 0.1 |

The present invention further provides an encapsulated colorant comprising a colorant having a particle size of from about 0.01 microns to about 25 microns, at least one oil selected from the group consisting of a naphthenic oil and an unsaturated oil, a viscosity adjusting agent, an adhesion promoter, a disperser vehicle, and at least one binder resin selected from the group consisting of a hydrocarbon modified rosin ester and a phenol modified hydrocarbon resin, wherein the encapsulated colorant is prepared by the method comprising (a) combining and mixing the oil or oils and the binder resin or resins until the resins are dissolved; (b) combining and mixing the solution obtained in (a) and the adhesion promoter; (c) combining and mixing the product of (b) and the disperser vehicle; and (d) combining and mixing the product of (c) with the colorant. Optionally, the viscosity adjusting agent can be added to the product of (c) prior to mixing it with the colorant. The present invention further provides a water-in-oil emulsion ink comprising an oil phase and a water phase, the oil phase comprising the encapsulated colorant set forth above.

The present invention also provides an improved digital duplicating process for producing images having high color strength, high image density, good image resolution, low set-off, low "bleed through", excellent runnability, and better environmental stability, the improvement comprising using an ink comprising an oil phase and a water phase, the oil phase comprising an encapsulated colorant having a particle size of from about 0.01 microns to about 25 microns, an adhesion promoter, and a binder resin selected from the group consisting of a hydrocarbon modified rosin ester and a phenol modified hydrocarbon resin.

The present invention further provides an improved digital duplicating process wherein the oil phase of the ink further comprises an agent that rapidly forms a tough film on the encapsulated colorant of the ink during the drying step of the duplicating process.

All of the references, including patents, and patent applications cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. An encapsulated colorant comprising a colorant having a particle size of from about 0.01 microns to about 25 microns, an oil component, an adhesion promoter, and at least one binder resin selected from the group consisting of a hydrocarbon modified rosin ester and a phenol modified hydrocarbon resin.

2. The encapsulated colorant of claim 1, wherein said encapsulated colorant comprises a hydrocarbon modified rosin ester and a phenol modified hydrocarbon resin.

3. The encapsulated colorant of claim 2, wherein said colorant is selected from the group consisting of carbon black, C.I. Blue 15:3, C.I. Violet 1, and C.I. Green 7.

4. The encapsulated colorant of claim 3, wherein said carbon black has a BET surface area of from about 20 square meters per gram to about 600 square meters per gram.

5. The encapsulated colorant of claim 4, wherein said carbon black has a particle size of from about 0.01 micron to about 2 microns.

6. The encapsulated colorant of claim 5, wherein said hydrocarbon modified rosin ester has a melting point of from about 100° C. to about 160° C.

7. The encapsulated colorant of claim 6, wherein said hydrocarbon modified rosin ester has a melting point of about 125° C.

8. The encapsulated colorant of claim 7, wherein said hydrocarbon modified rosin ester has an acid number of maximum 25 mg KOH/g.

9. The encapsulated colorant of claim 5, wherein said phenol modified hydrocarbon resin has a melting point of from about 130° C. to about 150° C.

10. The encapsulated colorant of claim 9, wherein said phenol modified hydrocarbon resin has a melting point of about 140° C. and an acid number of less than 1 mg KOH/g.

11. The encapsulated colorant of claim 9, wherein said adhesion promoter is oxidized polyethylene.

12. The encapsulated colorant of claim 11, wherein said oxidized polyethylene has an acid number of from about 14 to about 20 mg KOH/g.

13. The encapsulated colorant of claim 11, further comprising an oil selected from the group consisting of naphthenic and unsaturated oils.

14. The encapsulated colorant of claim 13, wherein said naphthenic oil has a viscosity of from about 300 SUS to about 2400 SUS at 100° F.

15. The encapsulated colorant of claim 14, wherein said naphthenic oil has a viscosity of 2117 SUS at 100° F. and a boiling point of 320° C.

16. The encapsulated colorant of claim 13, wherein said unsaturated oil is selected from the group consisting of soybean oil and linseed oil.

17. The encapsulated colorant of claim 16, wherein said encapsulated colorant further comprises a viscosity adjusting agent selected for the group consisting of mineral seal oil and a tall oil fatty acid ester.

18. The encapsulated colorant of claim 17, wherein said tall oil fatty acid ester is a $C_1$–$C_8$ alkyl ester of tall oil fatty acid.

19. The encapsulated colorant of claim 18, wherein said tall oil fatty acid ester is a butyl ester of tall oil fatty acid.

20. The encapsulated colorant of claim 19, wherein said encapsulated colorant further comprises a disperser vehicle having a viscosity of from about 3' to about 4' at 100° F. (bubble tube).

21. The encapsulated colorant of claim 20, wherein said disperser vehicle has a boiling range of 510° F. to 610° F. and an acid number of from about 10 to about 14 mg KOH/g.

22. The encapsulated colorant of claim 21, wherein said colorant is present in an amount of from about 30% by weight to about 45% by weight of said encapsulated colorant, said hydrocarbon modified rosin ester is present in an amount of from about 2% by weight to about 10% by weight of said encapsulated colorant, said phenol modified hydrocarbon resin is present in an amount of from about 1% by weight to about 10% by weight of said encapsulated colorant, said adhesion promoter is present in an amount of from about 0.5% by weight to about 6% by weight of said encapsulated colorant, said naphthenic oil is present in an amount of from about 20% by weight to about 45% by weight of said encapsulated colorant, said viscosity adjusting agent is present in an amount of up to about 25% by weight of said encapsulated colorant, and said disperser vehicle is present in an amount of up to about 20% by weight of said encapsulated colorant.

23. The encapsulated colorant of claim 21, wherein said colorant is present in an amount of from about 30% by weight to about 45% by weight of said encapsulated colorant, said hydrocarbon modified rosin ester is present in an amount of from about 2% by weight to about 10% by weight of said encapsulated colorant, said phenol modified hydrocarbon resin is present in an amount of from about 1% by weight to about 10% by weight of said encapsulated colorant, said adhesion promoter is present in an amount of from about 0.5% by weight to about 6% by weight of said encapsulated colorant, said unsaturated oil is present in an amount of from about 20% by weight to about 45% by weight of said encapsulated colorant, said viscosity adjusting agent is present in an amount of up to about 25% by weight of said encapsulated colorant, and said disperser vehicle is present in an amount of up to about 20% by weight of said encapsulated colorant.

24. A method of preparing the encapsulated colorant of claim 22, comprising combining and mixing said colorant, said binder resins, said adhesion promoter, said naphthenic oil, said viscosity adjusting agent, and said disperser vehicle in a suitable mixing device.

25. A method of preparing the encapsulated colorant of claim 23, comprising combining and mixing said colorant, said binder resins, said adhesion promoter, said unsaturated oil, said viscosity adjusting agent, and said disperser vehicle in a suitable mixing device.

26. An encapsulated colorant comprising a colorant having a particle size of from about 0.01 microns to about 25 microns, at least one oil selected from the group consisting of a naphthenic oil and an unsaturated oil, a viscosity adjusting agent, an adhesion promoter, a disperser vehicle, and at least one binder resin selected from the group consisting of a hydrocarbon modified rosin ester and a phenol modified hydrocarbon resin, wherein said encapsulated colorant is prepared by the method comprising (a) combining and mixing said oil or oils and said binder resin or resins until said resins are dissolved; (b) combining and mixing the solution obtained in (a) and said adhesion promoter; (c) combining and mixing the product of (b) and said disperser vehicle and optionally a viscosity adjusting agent; and (d) combining and mixing the product of (c) with said colorant.

27. A water-in-oil emulsion ink for use in digital duplicators comprising an oil phase and a water phase, said oil phase comprising an encapsulated colorant comprising a colorant having a particle size of from about 0.01 microns to about 25 microns, an oil component, an adhesion promoter, and a binder resin selected from the group consisting of a hydrocarbon modified rosin ester and a phenol modified hydrocarbon resin.

28. The water-in-oil emulsion ink of claim 27, wherein said encapsulated colorant comprises a hydrocarbon modified rosin ester and a phenol modified hydrocarbon resin.

29. The water-in-oil emulsion ink of claim 28, wherein said oil phase further comprises a film-forming component that is capable of forming a film on said encapsulated colorant during the duplicating process.

30. The water-in-oil emulsion ink of claim 29, wherein said film-forming component is selected from the group consisting of an alkyd resin and a terpene resin.

31. The water-in-oil emulsion ink of claim 30, wherein said alkyd resin is a modified tall oil fatty acid ester.

32. The water-in-oil emulsion ink of claim 31, wherein said modified tall oil fatty acid ester comprises an aromatic polycarboxylic acid modified tall oil fatty acid ester.

33. The water-in-oil emulsion ink of claim 32, wherein said aromatic polycarboxylic acid comprises isophthalic acid.

34. The water-in-oil emulsion ink of claim 33, wherein said isophthalic acid is present in an amount of from about 9% by weight to about 12% by weight of said modified tall oil fatty acid ester.

35. The water-in-oil emulsion ink of claim 34, wherein said modified tall oil fatty acid ester has an acid number of 8 mg KOH/g maximum.

36. The water-in-oil emulsion ink of claim 35, wherein said terpene resin has a melting point in the range of from about 100° C. to about 150° C.

37. The water-in-oil emulsion ink of claim 36, wherein said oil phase further comprises a surface active agent.

38. The water-in-oil emulsion ink of claim 37, wherein said surface active agent is sorbitan monooleate.

39. The water-in-oil emulsion ink of claim 38, wherein said oil phase further comprises an oil selected from the group consisting of drying oils and naphthenic oils.

40. The water-in-oil emulsion ink of claim 39, wherein said naphthenic oil has a viscosity of from about 50 to about 500 SUS at 100° F. (ASTM D2161).

41. The water-in-oil emulsion ink of claim 39, wherein said drying oil is selected from the group consisting of tung oil, mineral seal oil, and a $C_1$–$C_8$ alkyl ester of tall oil fatty acid.

42. The water-in-oil emulsion ink of claim 41, wherein said alkyl ester of tall oil fatty acid is a butyl ester of tall oil fatty acid.

43. The water-in-oil emulsion ink of claim 41, wherein said oil phase further comprises a rheological additive.

44. The water-in-oil emulsion ink of claim 43, wherein said rheological additive is an organically modified clay.

45. The water-in-oil emulsion ink of claim 44, wherein said organically modified clay is an organically modified montmorillonite clay.

46. The water-in-oil emulsion ink of claim 45, wherein said organically modified montmorillonite clay has a specific gravity of 1.6 g/cc.

47. The water-in-oil emulsion ink of claim 46, wherein said oil phase further comprises an antiskinning agent.

48. The water-in-oil emulsion ink of claim 47, wherein said antiskinning agent is an oxime.

49. The water-in-oil emulsion ink of claim 48, wherein said oxime is a ketoxime.

50. The water-in-oil emulsion ink of claim 49, wherein said ketoxime is methylethylketoxime.

51. The water-in-oil emulsion ink of claim 42, wherein said oil phase comprises said encapsulated colorant in an amount of from about 5% by weight to about 50% by weight of said emulsion ink, said film-forming component in an amount of from about 2% by weight to about 16% by weight of said emulsion ink, said oil in an amount of from about 3% by weight to about 30% by weight of said emulsion ink, and said surface active agent in an amount of from about 0.5% by weight to about 5% by weight of said emulsion ink, and said water phase comprising water in an amount of from about 20% by weight to about 85% by weight of said emulsion ink and a biocide in an amount of from about 0.05% by weight to about 0.5% by weight of said emulsion ink.

52. The water-in-oil emulsion ink of claim 47, wherein said water phase further comprises a thickening agent.

53. The water-in-oil emulsion ink of claim 52, wherein said thickening agent is a cellulose derivative.

54. The water-in-oil emulsion ink of claim 53, wherein said cellulose derivative is a hydroxyethylcellulose.

55. The water-in-oil emulsion ink of claim 54, wherein said hydroxyethylcellulose has a hydroxyethyl content of from about 1.9 to 2.3 moles per mole of the anhydroglucose unit.

56. The water-in-oil emulsion ink of claim 55, wherein said oil phase comprises said encapsulated colorant in an amount of from about 5% by weight to about 50% by weight of said emulsion ink, said film-forming component in an amount of from about 2% by weight to about 16% by weight of said emulsion ink, said oil in an amount of from about 3% by weight to about 30% by weight of said emulsion ink, said surface active agent in an amount of from about 0.5% by weight to about 5% by weight of said emulsion ink, said rheological additive in an amount of from about 0.5% to about 5% by weight of said emulsion ink, and said antiskinning agent in an amount of from about 0.01% to about 1% by weight of said emulsion ink, and said water phase comprising water in an amount of from about 20% by weight to about 85% by weight of said emulsion ink, said thickening agent in an amount of from about 0.5% by weight to about 3% by weight of said emulsion ink, and a biocide in an amount of from about 0.05% by weight to about 0.5% by weight of said emulsion ink.

57. An improved digital duplicating process for producing images having high color strength, high image density, good image resolution, low set-off, low bleed through, excellent runnability, and better environmental stability comprising applying a duplicating ink to image openings on a stencil, allowing said ink to permeate said image openings, and forming the desired printed images on a paper held in contact with said stencil, wherein the improvement comprises applying a duplicating ink comprising an oil phase and a water phase, said oil phase comprising an encapsulated colorant comprising a colorant having a particle size of from about 0.01 microns to about 25 microns, an oil component, an adhesion promoter, and a binder resin selected form the group consisting of a hydrocarbon modified rosin ester and a phenol modified hydrocarbon resin.

58. The improved digital duplicating process of claim 57, wherein said oil phase further comprising an agent that is capable of forming a film on said encapsulated colorant.

59. A water-in-oil emulsion ink for use in digital duplicators comprising an oil phase and a water phase, said oil phase comprising the encapsulated colorant of claim 26.

* * * * *

UNITED STATES PATENT AND TRADEMARK OFFICE
CERTIFICATE OF CORRECTION

PATENT NO. : 5,622,548
DATED : April 22, 1997
INVENTOR(S) : Zou et al.

It is certified that error appears in the above-identified patent and that said Letters Patent is hereby corrected as shown below:

In Column 7, line 30: "to about by" should read
--to about 7% by--.

In Column 10, line 57: "$C_1-C_8$ acid $C_1-C_8$ alkyl" should read
--acid $C_1-C_8$ alkyl--.

In Column 16, line 16: "5,000-1,000" should read
--5,000±1,000--.

Signed and Sealed this

Twenty-second Day of July, 1997

BRUCE LEHMAN

Attest:

*Attesting Officer*     *Commissioner of Patents and Trademarks*